United States Patent [19]

Hahn

[11] Patent Number: 5,611,701
[45] Date of Patent: Mar. 18, 1997

[54] COLLAPSIBLE PRONG PLUG DEVICE FOR BATTERY CHARGER

[75] Inventor: Stan S. Hahn, Moraga, Calif.

[73] Assignee: Asian Micro Sources, Inc., Moraga, Calif.

[21] Appl. No.: 552,443

[22] Filed: Nov. 3, 1995

Related U.S. Application Data

[63] Continuation of Ser. No. 201,247, Feb. 24, 1994, abandoned.

[51] Int. Cl.$^6$ .................................................. H01R 13/44
[52] U.S. Cl. .......................................... 439/131; 439/172
[58] Field of Search ..................................... 439/131, 171, 439/172, 173, 174, 928, 929

[56] References Cited

U.S. PATENT DOCUMENTS

| | | | |
|---|---|---|---|
| 1,485,193 | 2/1924 | McKay | 439/131 OR |
| 1,742,850 | 1/1930 | Douglas | 439/314 OR |
| 2,490,580 | 12/1949 | Colla, Jr. | 439/131 X |
| 2,538,296 | 1/1951 | Crocker | 439/131 X |
| 4,191,917 | 3/1980 | Brown et al. | 439/173 X |
| 4,518,212 | 5/1985 | Rumble | 439/221 X |
| 4,543,624 | 9/1985 | Rumble | 439/173 X |
| 4,626,052 | 12/1986 | Rumble | 439/173 OR |
| 4,743,829 | 5/1988 | Fenne et al. | 439/131 X |
| 4,911,649 | 3/1990 | Helmich, Jr. | 439/172 X |
| 4,973,827 | 11/1990 | Nozaki et al. | 439/173 X |
| 4,997,381 | 3/1991 | Oh | 439/131 X |
| 5,159,545 | 10/1992 | Lee | 439/173 X |
| 5,213,516 | 5/1993 | Okamoto | 439/171 X |

FOREIGN PATENT DOCUMENTS 7600749  8/1976  Netherlands.

Primary Examiner—Gary F. Paumen
Assistant Examiner—Daniel Wittels
Attorney, Agent, or Firm—Adam H. Tachner; Crosby, Heafey, Roach & May

[57] ABSTRACT

A collapsible prong plug device includes a casing, an electrical plug with one or more prongs rotatably mounted in the casing and movable between a collapsed and an extended position, a securing means designed to engage the electrical plug to maintain the plug in an extended position, and a releasable securing means. The securing means can be released by a user to allow the plug to be moved to the collapsed position. A preferred form of securing mechanism is a spring and a preferred form of release means is a slidable collapse bar, designed to engage and rotate the prongs.

A cradle or attachment means can be integrated into the casing, with an electrical connection and a mechanical connection so that a rechargeable battery or a device containing such a battery can be electrically and mechanically attached to the cradle. Alternatively, a cable can be fined with a power adapter plug and electrically connected to the basic device. A power supply within the casing allows the rechargeable device to be attached to the collapsible prong plug device and plugged directly into a wall socket.

9 Claims, 4 Drawing Sheets

COLLAPSIBLE PRONG PLUG DEVICE FOR BATTERY CHARGER

This is a continuation of application Ser. No. 08/201,247 filed on Feb. 24, 1994, entitled COLLAPSIBLE PRONG PLUG DEVICE FOR BATTERY CHARGER, now abandoned.

FIELD OF THE INVENTION

The present invention relates generally to an improved folding prong mechanism which is capable of folding into a casing for convenient transportation or storage and also capable of rotating to and being maintained in an extended position for insertion into a wall socket or extension cord.

BACKGROUND OF THE INVENTION

People in today's world rely heavily on a wide variety of electrical devices. Almost all of these devices draw power ultimately from a commercial source, usually delivered to the user through a wall outlet or socket. Accordingly, the electrical devices are fitted with a plug. Unfortunately, if the device is moved from location to location, the prongs of the plug extend outward and can be difficult to pack (or store) or can catch on clothing, packaging material and the like.

One particularly large class of portable electrical devices available today makes use of rechargeable batteries. For many devices, such as portable phones, video games, calculators, and the like, a battery is or can be fitted within the device itself. For some devices, the battery can be removed easily, while in other devices, the battery is not designed to be removed.

A variety of battery chargers are available for use with such devices. In general, a manufacturer provides a battery charger specifically designed for use with one or more products. Traditionally, the battery chargers are bulky devices, often weighing 500 grams or more. A typical charger includes a plug for insertion into a wall socket, and if the plug is moved, a problem may arise with leaving the prongs exposed. The specific size of the battery charger is determined by a number of factors, including power to be delivered during recharging and the presence or absence of special circuitry, for example to monitor the state of charge of a battery.

In one typical configuration, a power cord goes between the power supply and a wall socket, with a second power cord extending between the power supply and the device containing the battery. In another typical configuration, the power supply is built into a large module which is designed to be plugged directly into a wall socket. A single cord connects the power supply to the battery.

In some devices, a cradle or receptacle is built into a casing which is designed to accommodate a device including a battery, or sometimes a removable battery or battery pack. Many cellular or cordless phones are designed to mate with such a cradle in a recharging station. Many batteries for computers or power tools are also designed to mate with such a cradle or recharging station. The power supply may be incorporated in the charging station or may be separate.

A few plug devices have been designed with a plug or prongs which fold into a casing. This is particularly helpful for a device which may be moved from location to location or which is incorporated into the body of a device. For example, some rechargeable flashlights include the collapsible prongs which can be rotated into a position extending out from the body of the flashlight and plugged directly into a wall socket or extension cord. In another example, some telephone charging stations include a cradle for the telephone and a rotatable plug which can be extended into position for plugging into a wall socket, or collapsed into a space in the shell of the charging station, particularly so that a user may slip a charging station into a pocket, a briefcase, or other container, or simply for storage, as in a drawer.

Presently available collapsible plug devices suffer from various problems which make them inconvenient or even dangerous to use. In particular, the rotatable plug has only a weak spring holding the plug in position. It does not take much effort to collapse the plug, which may cause the plug to partially or completely pull out of a wall socket. This can compromise the electrical connection to the point that the plug no longer is in electrical contact with source current. In some circumstances, this may expose the prongs of the plug in such a way that a person, or even an animal, might come into contact with live current, thereby causing bodily harm. In addition, a collapsing plug might pinch the user.

The new device of this invention overcomes these problems by providing a plug device which can be securely maintained in the extended position but folded easily to a compact, collapsed position.

SUMMARY OF THE INVENTION

The present invention is a collapsible prong plug device including a casing, prongs rotatably mounted in the casing and movable between a collapsed and an extended position, a securing means designed to engage the prongs to maintain the prongs in an extended position, and a releasable securing means mechanically connected to the casing. The securing means can be released by a user to allow the prongs to be collapsed into the casing.

The invention also includes a cradle or attachment means integrated into the casing. This can be fitted with an electrical connection and a mechanical connection so that a rechargeable battery or a device containing such a battery can be electrically and mechanically attached to the cradle.

In a preferred embodiment, a power supply is provided within the casing so that the rechargeable device can be attached to the collapsible prong plug device and plugged directly into a wall socket. In another preferred embodiment, the device is coupled with a rechargeable device to provide an improved battery charging station. In yet another preferred embodiment, a power supply in the casing is connected by a wire and suitable adapter to an electronic device.

A preferred form of securing means is a spring. A preferred form of release means is a slidable bar which is designed to rotate a first rotatable prong, which in turn is connected to a second rotatable prong so that both prongs collapse simultaneously.

Accordingly, it is an object of this invention to provide a collapsible prong plug device which can be maintained in an extended position.

Another object of this invention is to provide releasable securing means so that a user can readily release the securing mechanism and move the prongs from an extended to a collapsed position.

DESCRIPTION OF THE PREFERRED EMBODIMENTS

The collapsible prong plug device of this invention includes a casing, two or more prongs mounted to the casing, a securing means, and a release mechanism. The specific shape of the casing can be modified in many ways to accommodate specific design needs. The prong can also be modified to accommodate specific design needs, including the number and configuration of electrical prongs to adapt to a variety of standard electrical outlets. The drawings illustrate a representative device but one skilled in the art will recognize that a variety of devices can be designed and manufactured, which are encompassed by the teachings of this invention.

Figure 1A:
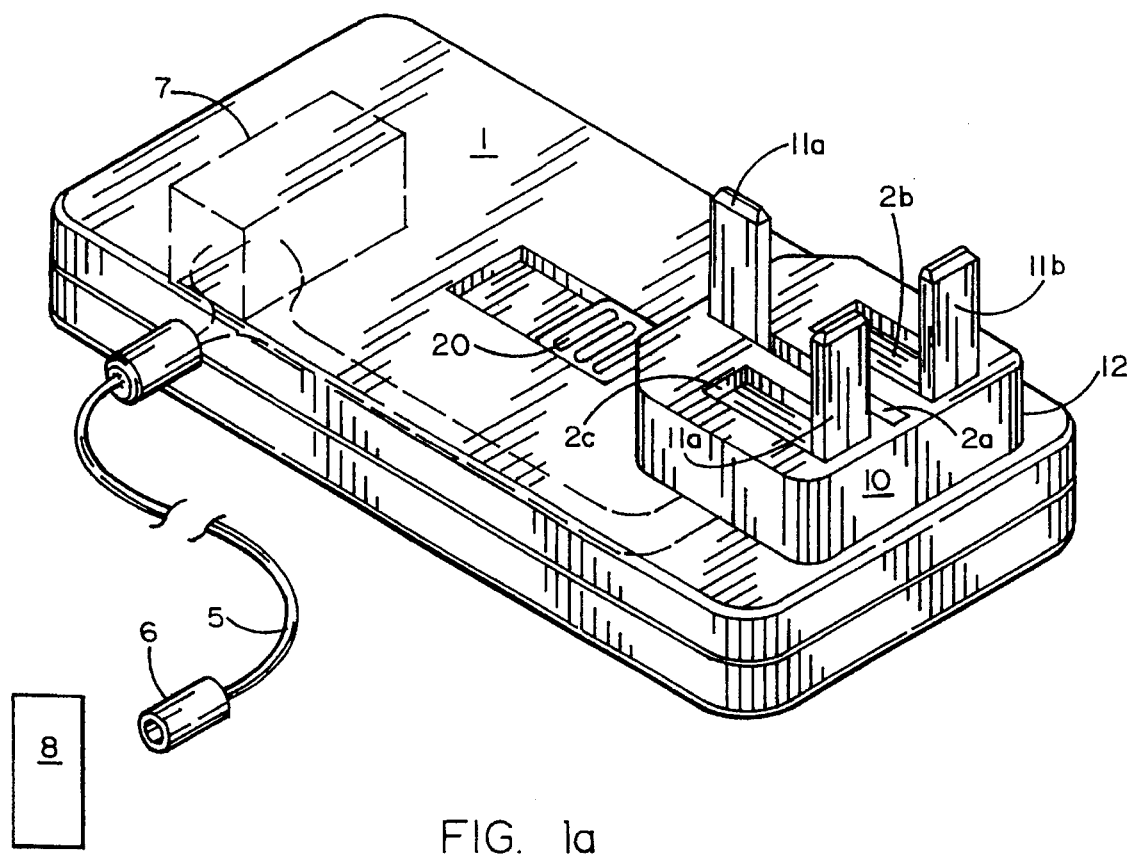
FIGS. 1A, 1B and 1C illustrate a perspective view of the collapsible prong plug device showing the prong in an extended position and movable to an intermediate position and a collapsed position.
Figure 1B:
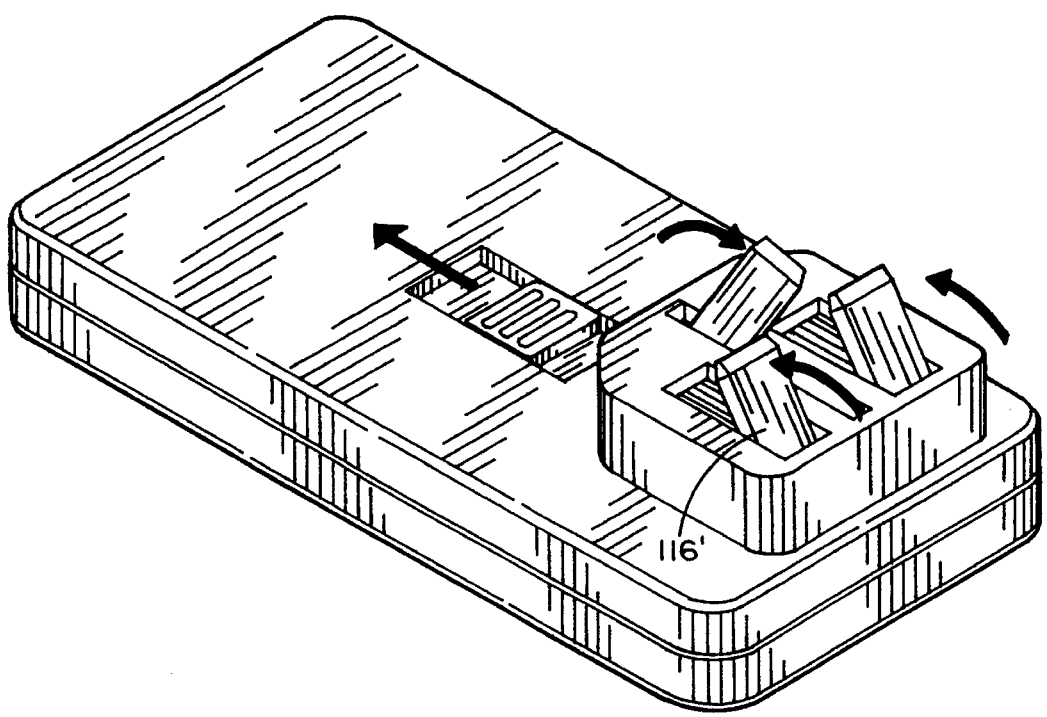
Figure 1C:
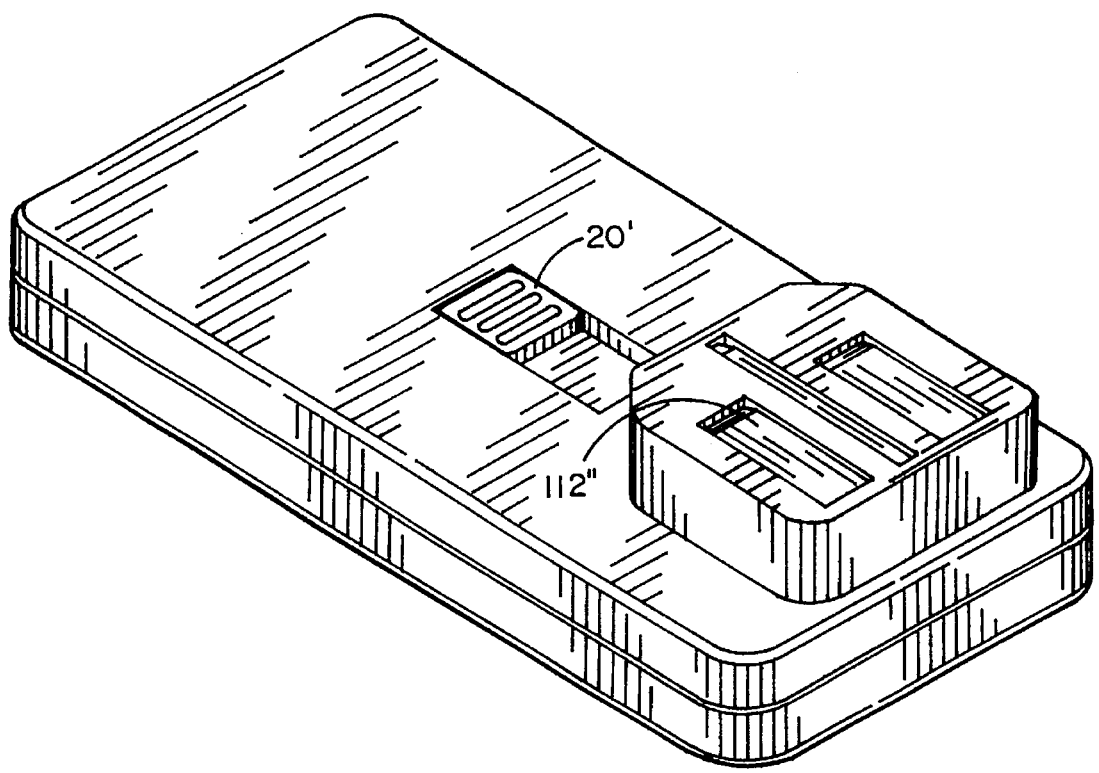

Referring to FIG. 1, casing 1 includes plug body 12 with cavities 2 (2A, 2B, 2C) which are designed to accommodate prongs 11 (11A, 11B, 11C) in collapsed position 11" so that each prong 11 is generally flush with top 4 of casing 1. For example, prong 11C can be moved from a collapsed position 11C" to intermediate position 11C' and to a fully extended position, as illustrated in FIGS. 1A, 1B and 1C. Release button 20 moves between positions 20' when the prongs are in the collapsed position to position 20 when the prongs are in the extended position. In a preferred embodiment, casing 1 is made of high impact thermoplastic material, with top and bottom halves which can be sealed together with ultrasonic bonding.

In one preferred embodiment, power supply 7 is connected to prongs 11 and also through electrical cable 5 to an electrical connection means such as power adapter plug 6, which can in turn be connected to an electronic device 8.

Figure 4:
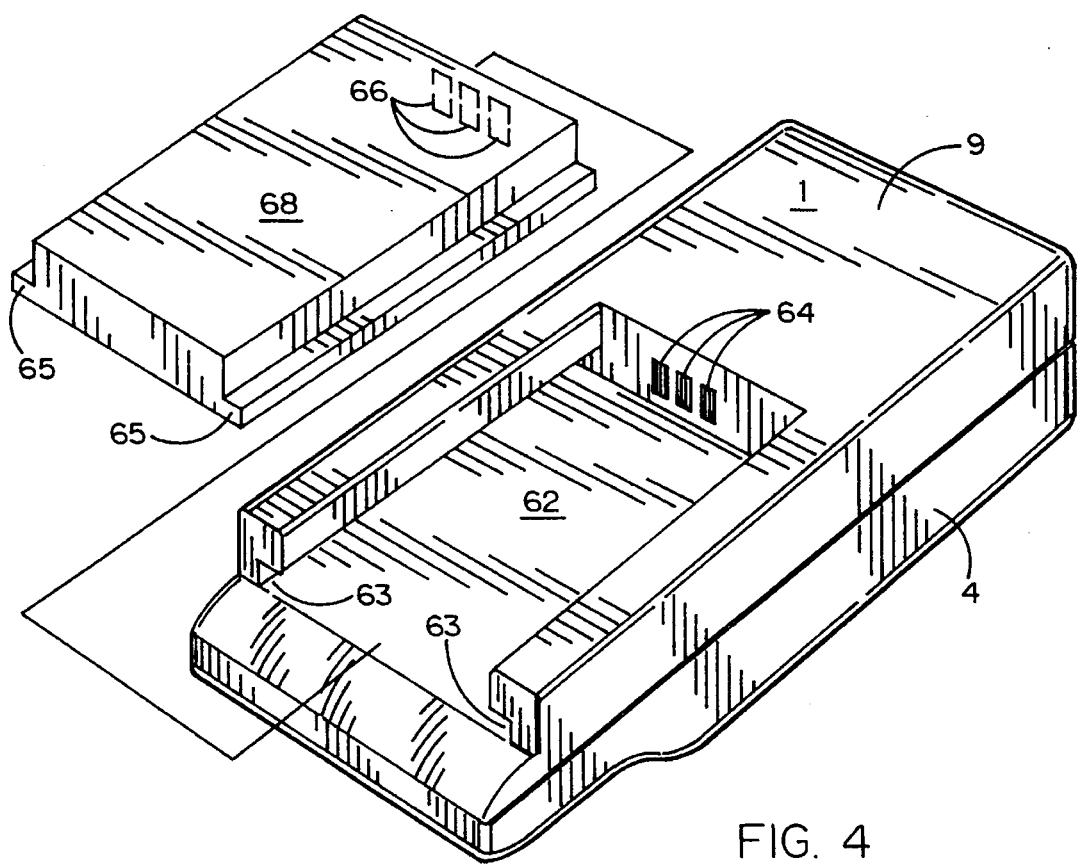
FIG. 4 illustrates a view of a charger with a cradle for a rechargeable device.

In another preferred embodiment, casing 1 incorporates a cradle or battery holder, as illustrated in FIG. 4. Referring to FIG. 4, bottom 9 of casing 1 includes cradle 62, with guide channels 63 and cradle electrical contacts 64. Battery 68 has tongues 65 to fit in channels 63 and battery electrical contacts 66 to connect with cradle electrical contacts 64. One skilled in the art can select one of several ways for battery 68 to be secured in cradle 62 by gravity, friction, or by a locking or other securing mechanism (not shown). The battery can thus be electrically and mechanically attached to the cradle. Power supply 7 can be connected to cradle electrical contacts 64 to provide power for battery 68.

Figure 2A:
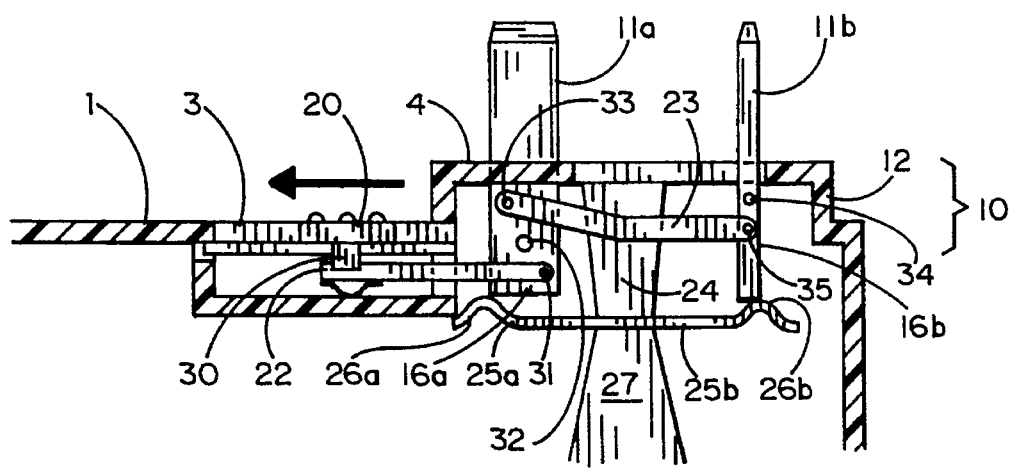
FIGS. 2A, 2B and 2C illustrate cross-sections of the device, showing the prongs in the fully collapsed position, in an intermediate position and in an extended position.
Figure 2B:
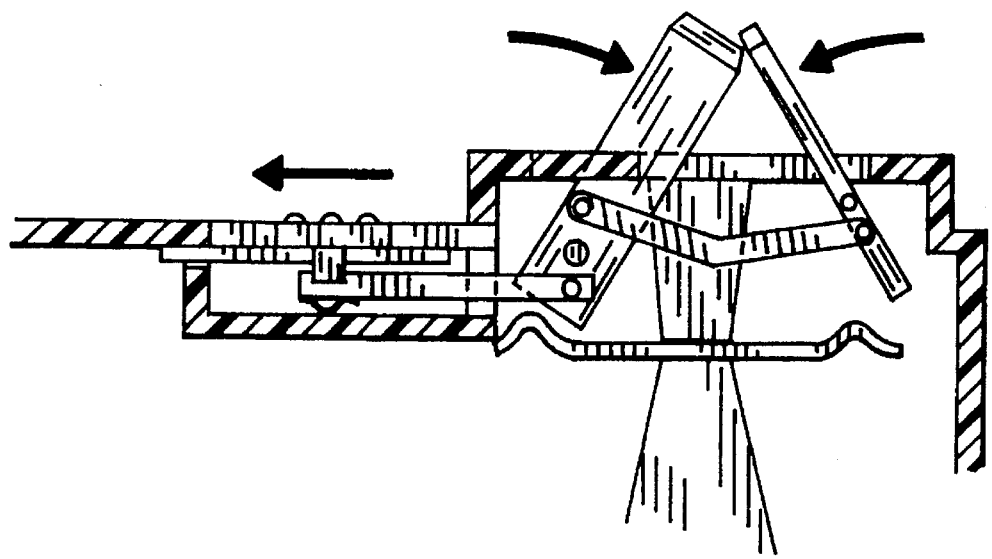
Figure 2C:
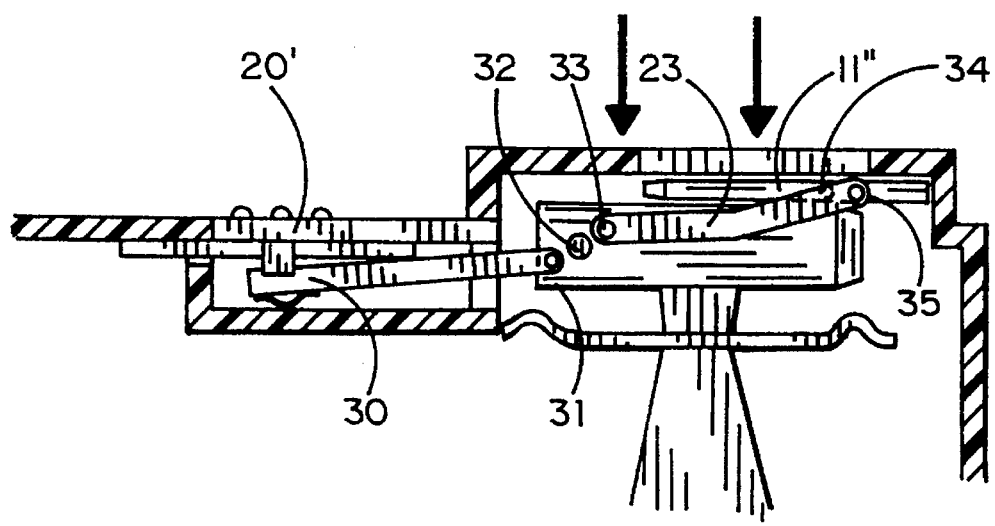
Figure 3:
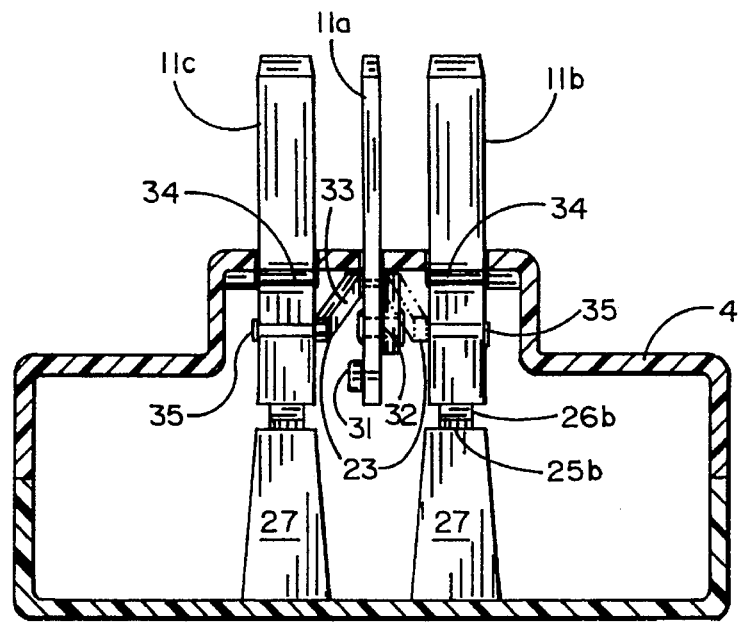
FIG. 3 illustrates an end-view cross-section, with the prongs in an extended position.

FIGS. 2A, 2B and 2C illustrate cutaway, side views of a preferred embodiment of the new device. Casing 1 includes various features to support and position various components of the device. Referring to FIGS. 2A, 2B and 2C, plug body 12 of electrical plug 10 is molded as part of casing 1. Prongs 11 are collapsed within cavities 2 (2A, 2B, 2C) below the top 4 of casing 1 (FIG. 2C), extended more or less perpendicular to top 4 (FIG. 2A), or at an intermediate position (FIG. 2B). Lower portions 16A, 16B, 16C of prongs 11A, 11B, 11C, respectively, are each positioned to engage spring tip 26A, 26B, or 26C of conducting spring 25A, 25B or 25C as prongs 11 are rotated from a collapsed to an extended position (and to disengage during the opposite rotation). This pushes conducting spring 25 downward but as rotation of prong 11 continues, lower portion 16 moves past spring tip 26 so that conducting spring 25 can return to approximately its resting position, with sufficient pressure to establish good electrical connection with lower portion 16 of prong 11. Moving lower portion 16 past spring tip 26 requires some force to overcome the tension in conducting spring 25, which will tend to maintain prongs 11 in either the collapsed position shown in FIG. 2C or in the fully extended position shown in FIG. 2A. The dimensions and position of spring tip 26 can be designed to secure prong 11 in a desired position when extended, maintain that position by the tension of conducting spring 25.

Each conducting spring 25 is mounted within casing 1 and positioned and supported by a corresponding spring guide 27. One conducting spring 25 is provided for connection to each prong 11.

A typical collapsible prong plug includes two or three prongs 11. The figures illustrate a typical British plug, but the same teachings and principles can be applied to design and use collapsible prong plug devices for American, European or other plugs.

Referring to FIGS. 2A, 2B, 2C and 3, collapse bar 22 is slidably positioned within casing 1, movable in opening 3 between positions 20 and 20'. Collapse bar 22 is connected through pivot point 30 to release button 20 and through pivot point 31 near lower portion 16A of prong 11A. Prong 11A is rotatably mounted to casing 1 through pivot point 32. Similarly, prong 11B is rotatably mounted to casing 1 through a first pivot point 34 and prong 11C is rotatably mounted to casing 1 through a second pivot point 34. Prongs 11B and 11C are connected together at corresponding pivot points 35 to connecting bar 23 which is connected in turn to pivot point 33 on prong 11A. Collapse bar 22 and connecting bar 23 are preferably constructed of non-conducting material.

The relative positions of the pivot points are as shown in the figures. As release button 20 is moved away from plug 10, collapse bar 22 is pulled in the same direction. Since pivot point 31 is below pivot point 32 (in the view shown), this will begin to rotate lower portion 16A of prong 11A towards release button 20 and rotate the top of prong 11A away from release button 20, that is, towards a collapsed position. Pivot point 33 is opposite pivot point 31, relative to pivot point 32, so pivot point 33 also moves away from release button 20, moving connecting bar 23 and pivot points 35 in the same direction. Since pivot points 35 are below pivot points 34, this will begin to rotate the lower portion of prongs 11B, 11C away from release button 20 and rotate the top of each prong 11B, 11C towards release button 20, that is, towards a collapsed position.

The pressure of conducting springs 25 will maintain prongs 11 in the extended position until a user activates release button 20, moving it from the extended position shown in FIG. 2A to the collapsed position 20' shown in FIG. 2C. The user must apply sufficient force to move each lower portion 16 of each prong 11 past each spring tip 26, thereby increasing the resistive force of each conducting spring 25. As lower portions 16 of prongs 11 disengage conducting spring tips 26, electrical contact is broken. Once the release button is moved far enough so that lower portions 16 of prongs 11 have moved across and free of spring tips 26, the user can move prongs 11 to the collapsed position.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A collapsible prong plug device comprising a casing, an electrical plug with a first and a second prong rotatably mounted in said casing, said first and said second prong rotatable between a collapsed and an extended position, relative to said casing, the direction of rotation of said first prong being opposite to the direction of rotation of said second prong, a securing means mechanically connected to said casing and designed to engage said second prong to maintain said second prong in said extended position, and a release means mechanically connected to said casing and designed to engage said second prong and release it from said securing means, whereby the second prong is maintained in the extended position until and unless a user releases the release means.

2. The collapsible prong plug device of claim 1 further comprising a cradle means or attachment means integrated into said casing, an electrical connection means fitted in said cradle means or attachment means, and a mechanical connection means fitted in said cradle means or attachment means, whereby a device can be received and electrically and mechanically attached to said cradle means or attachment means.

3. The collapsible prong plug device of claim 1 further comprising an electrical cable connected to said casing and connectable to said prongs, and an electrical connections means connected to said electrical cable, said electrical connection means designed to provide an electrical connection to a device, whereby said device can be connected to a source of power.

4. The collapsible prong plug device of claim 1 further comprising a power supply mounted within said casing and mechanically and electrically connected to said prongs.

5. The collapsible prong plug device of claims 2 and 4 further comprising a connection means between said power supply and said electrical connection means fitted in said cradle means or attachment means.

6. The collapsible prong plug device of claims 3 and 4 wherein said electrical cable is connected to said prongs through said power supply, said collapsible prong plug device further comprising a connection means between said power supply and said electrical connection means connected to said electrical cable.

7. The collapsible prong plug device of claim 1 herein said securing means comprises a spring loaded arm for engaging said second prong.

8. A power supply with a collapsible prong plug comprising a casing, an electrical plug with a first and a second prong rotatably mounted in said casing, said first and said second prong mechanically and electrically connected to said power supply, said first and said second prong rotatable between a collapsed and an extended position, relative to said casing, the direction of rotation of said first prong being opposite to the direction of rotation of said second prong, a securing means mechanically connected to said casing and designed to engage said second prong to maintain said second prong in said extended position, a release means mechanically connected to said casing and designed to engage said second prong and release it from said securing means, whereby the second prong is maintained in the extended position until and unless a user releases the release means, a cradle means or attachment means integrated into said casing, an electrical connection means fitted in said cradle means or attachment means, electrically connected to said power supply, and a mechanical connection means fitted in said cradle means or attachment means, whereby a device can be received and electrically and mechanically attached to said cradle means or attachment means.

9. A battery charger with a collapsible prong plug comprising a casing, a power supply mounted within said casing, an electrical plug with a first and a second prong rotatably mounted in said casing, said first and said second prong mechanically and electrically connected to said power supply, said first and said second prong rotatable between a collapsed and an extended position, relative to said casing, the direction of rotation of said first prong being opposite to the direction of rotation of said second prong, a securing means mechanically connected to said casing and designed to engage said second prong to maintain said second prong in said extended position, a release means mechanically connected to said casing and designed to engage said second prong and release it from said securing means, whereby the second prong is maintained in the extended position until and unless a user releases the release means, a cradle means or attachment means integrated into said casing, an electrical connection means fitted in said cradle means or attachment means, electrically connected to said power supply, a mechanical connection means fitted in said cradle means or attachment means, and said cradle designed to be mechanically connected to a device including a rechargeable battery so as to establish an electrical connection between said rechargeable battery and said power supply through said electrical connection means in said cradle, whereby said device can be received and electrically and mechanically attached to said cradle means or attachment means.

* * * * *

UNITED STATES PATENT AND TRADEMARK OFFICE
CERTIFICATE OF CORRECTION

PATENT NO. : 5,611,701

DATED : March 18, 1997

INVENTOR(S) : Hahn

It is certified that error appears in the above-identified patent and that said Letters Patent is hereby corrected as shown below:

On the title page, item 57, Abstract, second paragraph, fifth line, please delete "fined" and insert therefor --fitted--.

In column 3, line 20, delete "an" and insert therefor --art--.

In column 4, line 67, delete "an" and insert therefor --art--.

In column 5, line 41, delete "connections" and insert therefor --connection--.

In column 5, line 59, delete "herein" and insert therefor --wherein--.

Signed and Sealed this

First Day of July, 1997

Attest:

*Attesting Officer*

BRUCE LEHMAN

*Commissioner of Patents and Trademarks*